US007964228B2

(12) United States Patent
Milliorn

(10) Patent No.: US 7,964,228 B2
(45) Date of Patent: Jun. 21, 2011

(54) METHOD FOR ENHANCING FOOD SAFETY

(75) Inventor: J. Michael Milliorn, Fort Worth, TX (US)

(73) Assignee: Ecolab USA Inc., St. Paul, MN (US)

( * ) Notice: Subject to any disclaimer, the term of this patent is extended or adjusted under 35 U.S.C. 154(b) by 1073 days.

(21) Appl. No.: 11/115,690

(22) Filed: Apr. 27, 2005

(65) Prior Publication Data

US 2005/0194090 A1 Sep. 8, 2005

Related U.S. Application Data

(63) Continuation-in-part of application No. 10/799,430, filed on Mar. 12, 2004, now abandoned, and a continuation-in-part of application No. 10/799,319, filed on Mar. 12, 2004, now abandoned, and a continuation-in-part of application No. 09/938,920, filed on Aug. 24, 2001, now abandoned, and a continuation-in-part of application No. 09/912,621, filed on Jul. 24, 2001, now abandoned, and a continuation-in-part of application No. 09/912,755, filed on Jul. 24, 2001, now abandoned.

(51) Int. Cl.
*A23B 4/00* (2006.01)

(52) U.S. Cl. ............ 426/383; 426/87; 426/418; 40/637; 40/638; 206/459.1; 206/459.5

(58) Field of Classification Search .................... 426/87, 426/383, 112, 393, 394, 418, 524; 206/459.1, 206/459.5, 554; 40/637, 638
See application file for complete search history.

(56) References Cited

U.S. PATENT DOCUMENTS

| | | | | | |
|---|---|---|---|---|---|
| 3,421,239 | A * | 1/1969 | Smith | | 40/657 |
| 3,616,114 | A | 10/1971 | Hamaguchi | | |
| 3,709,763 | A | 1/1973 | O'Neil | | |
| 3,837,100 | A * | 9/1974 | Guida | | 40/637 |
| 4,055,249 | A | 10/1977 | Kojima | | |
| 4,060,168 | A | 11/1977 | Romagnoli | | |
| 4,324,058 | A | 4/1982 | Sherwick | | |
| 4,580,360 | A * | 4/1986 | Gribb | | 40/638 |
| 4,661,189 | A | 4/1987 | Voy | | |
| 4,680,210 | A | 7/1987 | Corcoran | | |
| 4,889,234 | A | 12/1989 | Sorensen | | |
| 5,073,422 | A * | 12/1991 | Konno et al. | | 428/40.7 |
| 5,172,936 | A | 12/1992 | Sullivan | | |
| 5,179,897 | A | 1/1993 | Liebregts | | |
| 5,271,643 | A | 12/1993 | Hafele | | |
| 5,389,415 | A | 2/1995 | Kaufmann | | |
| 5,449,201 | A | 9/1995 | Miller | | |
| 5,472,756 | A | 12/1995 | Sechet | | |
| 5,484,168 | A | 1/1996 | Chigot | | |
| 5,582,433 | A | 12/1996 | Sisson | | |
| 5,624,520 | A | 4/1997 | Nedblake | | |
| 5,704,648 | A | 1/1998 | Brown | | |
| 5,722,178 | A | 3/1998 | Wells | | |
| 5,738,383 | A | 4/1998 | Main et al. | | |
| 5,790,718 | A * | 8/1998 | Tenner et al. | | 383/127 |
| 5,866,183 | A | 2/1999 | Small | | |
| 5,874,142 | A | 2/1999 | Hoffmann | | |
| 5,881,597 | A | 3/1999 | Brooks | | |
| 5,895,075 | A | 4/1999 | Edwards | | |
| 5,900,610 | A | 5/1999 | Kelly | | |

(Continued)

*Primary Examiner* — Drew E Becker
(74) *Attorney, Agent, or Firm* — Merchant & Gould, P.C.

(57) ABSTRACT

The present invention relates to adhesive labels for use in food safety labeling systems and methods of using the adhesive labels to enhance food safety and food rotation.

4 Claims, 4 Drawing Sheets

U.S. PATENT DOCUMENTS

| | | | | |
|---|---|---|---|---|
| 5,922,422 | A | 7/1999 | Otruba | |
| 5,958,536 | A | 9/1999 | Gelsinger | |
| 5,967,561 | A | 10/1999 | Glenn | |
| 6,113,271 | A | 9/2000 | Scott | |
| 6,135,507 | A | 10/2000 | Hamby | |
| 6,187,128 | B1 | 2/2001 | Oosterlinck | |
| 6,309,745 | B1 | 10/2001 | Willms | |
| 6,332,631 | B1 | 12/2001 | Kirk | |
| 6,397,503 | B1 * | 6/2002 | Cain et al. | 40/110 |
| 6,403,184 | B1 | 6/2002 | Michlin | |
| 6,420,006 | B1 | 7/2002 | Scott | |
| 6,461,708 | B1 | 10/2002 | Dronzek | |
| 6,471,815 | B1 | 10/2002 | Mace | |
| 6,523,286 | B2 * | 2/2003 | Leicher | 40/311 |
| 6,938,768 | B2 * | 9/2005 | Ferretti et al. | 206/459.1 |
| 2002/0134498 | A1 * | 9/2002 | Pennino et al. | 156/277 |
| 2003/0020274 | A1 | 1/2003 | Milliorn | |
| 2003/0039786 | A1 | 2/2003 | Milliorn | |
| 2005/0008743 | A1 * | 1/2005 | Marquis | 426/383 |

* cited by examiner

METHOD FOR ENHANCING FOOD SAFETY

CROSS REFERENCE TO RELATED APPLICATIONS

This application is a continuation-in-part of U.S. patent application entitled “Adhesive Label Having Nonadhesive Tab Portion,” Ser. No. 09/912,755, filed on Jul. 24, 2001, U.S. patent application entitled “Process For Making Labels Having Nonadhesive Portion,” Ser. No. 09/938,920, filed on Aug. 24, 2001, U.S. patent application entitled “Process for Making Labels Having Nonadhesive Portion,” Ser. No. 10/799,430, filed on Mar. 12, 2004, U.S. patent application entitled “Triangle Shaped Labels And Improved Configuration Process,” Ser. No. 09/912,621, filed on Jul. 24, 2001, and U.S. patent application entitled “Triangle Shaped Labels and Improved Configuration Process,” Ser. No. 10/799,319, filed on Mar. 12, 2004, all of which are incorporated herein by reference in their entirety.

FIELD OF THE INVENTION

The present invention relates to adhesive labels for use in food safety labeling systems and methods of using the adhesive labels to enhance food safety and food rotation.

BACKGROUND OF THE INVENTION

Existing labels range in size and shape, and have specific adhesive and face materials for various specific purposes. For example, food safety is a major concern for restaurants and other establishments involved in the storage and preparation of food for human consumption (the food services industry). To ensure such food safety, the food services industry applies adhesive labels to the surfaces of containers holding food to inform the food handler as to the types of food and its date of preparation and/or date of possible spoilage or nonuse. These labels are a part of food safety labeling systems and there are numerous variations of food safety labeling systems currently on the market. Presently the labels most commonly used in food safety labeling systems are circles, squares, and rectangles.

There are three main types of labels used in these food safety labeling systems—day of the week FIFO (first in first out) systems, shelf-life/product identification labels and use by/use first labels. Food safety labeling systems also use an industry standard color code system of blue for Monday, yellow for Tuesday, red for Wednesday, brown for Thursday, green for Friday, orange for Saturday, and black for Sunday on the labels. These colors are used to quickly identify the days of the week on labels used in food safety labeling systems.

It is desired that an adhesive label used in such a manner be able to function in both high and low temperature environments. Specifically, the adhesive label must remain adhered to the surface of the container under refrigerated conditions. Additionally, it is desirable to have a label resistant to high temperatures so that if the container is cleaned before the label is removed, it will not deteriorate during cleaning and can be easily removed later.

It is customary practice to replace the adhesive label with a new label once the food is used and the container is cleaned. To remove the label, an individual normally removes the label by hand or by using a high temperature washing. There are adhesive labels that are known to dissolve when subjected to such high temperature conditions, such as in a high temperature dishwasher. If such a dissolvable label is not used, however, the adhesive layer holding a conventional label to the surface frequently is difficult to separate from the surface of the food container in order to remove the label from the container, and the label has a tendency to leave a residue or a label remnant on the surface. This is especially true after the container has been washed and the label has begun to deteriorate.

There are three main components used in the production of adhesive or pressure sensitive adhesive labels. The process, commonly referred to as “converting” requires a pressure sensitive or adhesive substrate, and converting machinery that includes a cutting die or other cutting means. An additional aspect of adhesive or pressure sensitive label converting is printing on the front of the label. This is done using printing inks and clays during the converting process.

A pressure sensitive or adhesive substrate is a construction of three elements: face material, adhesive, and liner. The substrate is generally produced by and purchased from a specialty supplier of adhesive materials. The face material is most commonly paper but can also be polyester, vinyl, polypropylene, or even foil. The type of face materials selected for a label is determined by the intended use of the label and the desired quality of the printing. The adhesive is the part of the label that makes it stick and is coated to the undersurface of the face material while the substrate is being produced. There are several types of adhesives applicable for various applications. Examples include permanent, removable, water-soluble, and cold temperature adhesives. The liner is a silicone coated sheet of paper that allows the face material and adhesive to be easily removed for application on other surfaces. The adhesive substrate is usually supplied in rows and during the converting process the substrate is referred to as the “web.”

The cutting die is a precision-machined rotary tool that cuts its substrate into shapes. The cutting die is made of steel and has sharpened blades that cut through the face material and adhesive, but does not cut into the liner. The die cuts the substrate as it passes through the cutting die located in the converting machinery. Cutting of the shapes into the substrate can also be performed by lasers.

After the shapes have been cut into a web, the waste area between the labels is pulled away. This waste area is called the “matrix.” Removal of the matrix leaves the individual label shape on the liner to be wound back into a roll for further processing. Cutting dies and lasers can cut very simple shapes such as circles or squares, or very complex shapes depending on the application. The labels are then processed through the printing press portion of the converting machinery and the rolls of labels are further processed on a rewinder. The blade on the rewinder slits the web into individual strips, which are round into small rolls of generally 500 to 1000 labels each. The small rolls are then packaged for shipping.

Adhesive labels are produced in a variety of shapes. When labels are produced in the shapes of circles, squares, and rectangles, there is a substantial amount of matrix or waste area left between the individual shapes after the cutting die has cut the shapes into the web. The size of this matrix results in a substantial amount of adhesive substrate being required for the production of rolls of circular, square, and rectangular shaped labels.

It is customary to print text on labels with the specific orientation to the shape of the label. To facilitate application of the labels onto selected surfaces, the labels are often oriented in the same position on the liner. There are generally two accepted copy positions for labels—copy on the bottom of the label dispensing first, and copy on the right side of the label dispensing first. This allows the label to be applied right side up and/or to be easily written on with minimum handling of the label once it is removed from the roll of labels.

Depending on the label shape and the print on the label, orienting the labels in a specific manner can result an inefficient spacing of labels, which also results in an increased material consumption and waste generation of the substrate.

Thus, there is a demonstrated need for a process of converting labels that produces the highest number of labels on the smallest amount of substrate. Specifically, the more labels produced in a given area, the less material is consumed, and the less waste material is generated.

Further, there is a need to orient the labels in a manner that conforms to the need of a consistent application direction. There is also a need to orient the printing on the labels in a manner that conforms to the need of a consistent application direction. There is also a need for a triangular shaped label for use in food safety labeling system that is substantially the same size as current circular square shaped labels but can be converted using a substantially smaller amount of material.

Additionally, there is a need for a label for use in food safety labeling systems that will remain securely adhered to a surface, but is easily removed from that surface without leaving an adhesive residue or other label remnant. There is also a demonstrated need for an adhesive label that can stand extreme temperature fluctuations but without compromising the label integrity, enabling it to be removed later. Finally, there is a need for a label for use in food safety labeling systems that includes a nonadhesive portion configured for grasping in order to more easily remove the label from the surface of a container.

SUMMARY OF THE INVENTION

In accordance with the present invention, there is provided an adhesive label comprising a sheet material operable to withstand extreme conditions, such as extreme hot and cold, and is highly resistant to physical wear. Importantly, the adhesive label of the present invention will not dissolve, wear off, or leave a residue when subjected to washing conditions. Particularly, the adhesive label of the present invention includes a sheet material having first and second opposite sides, wherein the first side includes an adhesive layer adapted to releasably adhere to a substrate and a second side is adapted to be written upon with a pencil or pen. The label further includes at least a portion of the first side being free of any adhesive layer. In this way, the adhesive free portion of the label provides the user with a tab portion that is used to physically lift the label from the receiving surface. Therefore, in accordance with a general embodiment of the present invention, there is provided an adhesive label comprising a first section having first and second opposite sides. The first side of the first section comprises an adhesive adapted to releasably adhere the label to a receiving surface. A second section is joined to the first section, the second section being configured to extend away from the first section so as to form a tab portion, the tab portion having a first side that is contiguous with the first side of the first section, and the first side of the tab portion is free of an adhesive layer.

In a further embodiment of the present invention, the tab portion, or second section, of the adhesive label of the present invention includes an edge that converges with an edge of the first section. In this embodiment, the two converting edges define an arcuate or rounded edge that is resistant to tearing when the tab portion is lifted away from the receiving surface to remove the label.

In a further embodiment of the present invention, the adhesive label is fabricated from a polypropylene material that includes an adhesive layer comprising a rubber based hot melt adhesive.

In accordance with an embodiment of the present invention, an adhesive label is produced by a process that includes the steps of providing a web consisting of an adhesive label substrate having a face material, an adhesive layer and a liner in which the web has a web width and a web direction. The web also includes a plurality of nonadhesive strips positioned between parallel aligned adhesive portions in which the strips and portions are oriented and in parallel alignment with the web direction. The web is positioned in a label converting machine wherein the web is continuously pulled through a converting machine and a preselected web direction. A plurality of labels is configured on the web wherein a first portion of each label overlays a nonadhesive strip and the second portion of each label overlays an adhesive portion. Each label has front and back surfaces. The pluralities of labels are cut on the web and the front surfaces of the labels are printed with indicia used in food safety labeling systems. Thereafter, the labels are processed into individual rolled strips for use in food safety labeling systems. This process is further described in U.S. patent applications entitled "Process for Making Labels Having Nonadhesive Portion, " Ser. Nos. 10/799,430 and 09/938,920, filed on Mar. 12, 2004 and Aug. 24, 2001 respectively, which are incorporated herein by reference in their entirety.

In accordance with yet another embodiment of the present invention, an adhesive label is produced by a process that includes the steps of providing a web consisting of an adhesive label substrate having a face material, an adhesive layer and a liner. The web is positioned in a label converting machine when the web is continuously pulled through the converting machine in a preselected web direction. A plurality of triangular shaped labels are configured on the face material in which each label has a first, second and third side wherein the first side of adjacent labels face each other and the second side of adjacent labels face each other and the third side of each label faces outwardly from the web width. The labels are cut on the web and then printed. The labels are then further processed into individual rolled strip. This process is further described in U.S. patent applications entitled "Triangle Shaped Labels and Improved Configuration Process," Ser. Nos. 09/912,621 and 10/799,319, filed on Jul. 24, 2001 and Mar. 12, 2004 respectively, which are incorporated herein by reference in their entirety.

The forgoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a base for modifying or designing other structures for carrying out the same purposes of the present invention. It should also be realized by those skilled in the art that such equivalent constructions do not depart from spirit and scope of the invention as set forth in the appended claims. The novel features which are believed to be the character scope of the invention, both as to its organization and method of operation, together with further objects and advantages will be better understood from the following description when considered in connection with the accompanying figures. It is to be expressly understood however, that each of the figures is provided for the purpose of illustration and description only and it is not intended as a definition of the limits of the present invention.

BRIEF DESCRIPTION OF THE DRAWINGS

For a more complete understanding of the present invention reference is now made to the following descriptions taken in conjunction with the accompanying drawings in which.

Additional and alternative embodiments and figures are included in U.S. patent application entitled "Adhesive Label Having Nonadhesive Tab Portion," Ser. No. 09/912,755, filed on Jul. 24, 2001, U.S. patent application entitled "Process For Making Labels Having Nonadhesive Portion," Ser. No. 09/938,920, filed on Aug. 24, 2001, U.S. patent application entitled "Process for Making Labels Having Nonadhesive Portion," Ser. No. 10/799,430, filed on Mar. 12, 2004, U.S. patent application entitled "Triangle Shaped Labels And Improved Configuration Process," Ser. No. 09/912,621, filed on Jul. 24, 2001, and U.S. patent application entitled "Triangle Shaped Labels and Improved Configuration Process," Ser. No. 10/799,319, filed on Mar. 12, 2004, all of which are incorporated herein by reference in their entirety.

DETAILED DESCRIPTION OF THE PREFERRED EMBODIMENTS

Figure 1:
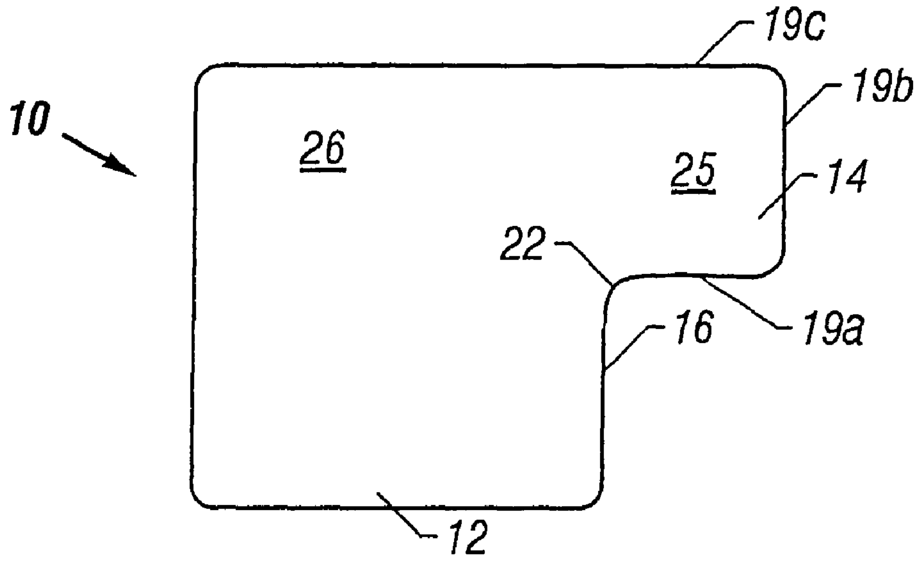
FIG. 1 is a front side view of a preferred embodiment of the present invention showing the converting label edges forming a rounded corner between the tab portion and the label portion.
Figure 2:
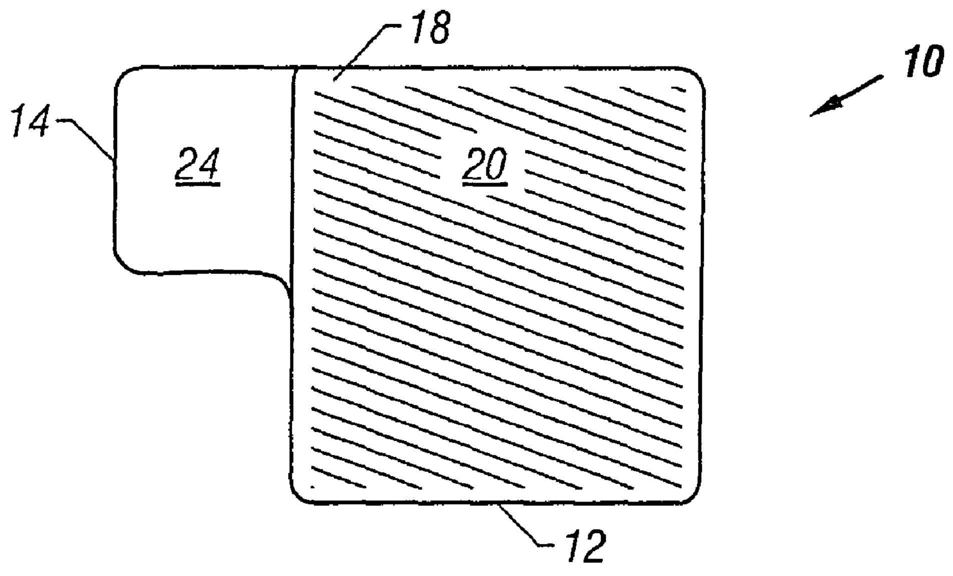
FIG. 2 is a back side view of the preferred embodiment of the present invention illustrating the position or relationship between the tab portion and the label portion of the adhesive layer.

The present invention will now be better understood below by reference to the attached figures. Referring to FIGS. 1 and 2, there is shown an illustrative embodiment of an adhesive label that is adapted to withstand extreme fluctuations in environmental conditions, yet provide a label that is readily and easily removed from a receiving surface without leaving an adhesive residue or other label remnant.

As shown in FIG. 1, a preferred embodiment of the presently disclosed label includes an adhesive label (10) comprising a first section (12) contiguous with a second section (14). The second section forms a tab portion extending from the first section (12). The first section (12) has a first or back side (20) and a second or front side (26). The second section (14) has a first or back side (24) and a second or front side (25). Referring to FIG. 2, an adhesive layer (18) is provided on the first or back side (20) of the first section (12) for adhering the label to a receiving surface. The second or front sides (26) of the first section (12) and the second or front side (25) of the second section (14) have surfaces that allowing printing or writing thereon.

Referring to FIG. 2, there is shown a back view of the adhesive label (10). As shown, the adhesive layer (18) is provided across the first or back side (20) of only the first section (12) of the label (10), and the first or back side (24) of the second section (14) does not include an adhesive layer (18). In this way, the user of the label (10) places the label (10), or more specifically the first section (12), in contact with the substrate so as to adhere the adhesive layer (18) to the substrate surface. The tab portion (14), which does not include an adhesive layer, the first or back side (24) remains free from attachment to the substrate surface. To remove the label (10), the user simply grasps the tab portion (14) and pulls upwardly on the tab, thereby lifting the label (10) off of the substrate.

It is preferred that the label (10) of the present invention be removable from a substrate, such as a food container, without leaving behind a label (10) remnant or residue from the adhesive layer (18). It is therefore preferable that the adhesive layer (18) be made from an easily removable adhesive, such as that commonly known in the art as a rubber based hot melt adhesive. In this regard, an adhesive suitable for use with the present invention is an adhesive sold by AVERY DENNISON under the trade name FASSON®. This adhesive is further preferred because it has an application temperature range of −10° C. to 50° C. and a wide service temperature range of −40° C. to 50° C. Additionally, the preferred adhesive provides a label (10) that will remain adhered to the substrate under wash conditions, yet is easily removed from the substrate by simply lifting upwardly on the tab portion (14).

Referring to FIG. 1, the tab portion (14) is shown having edges (19*a-c*) in which lower and upper side edges (19*a*) and (19*c*) respectively are parallel to each other and edge (19*b*) is the outer edge of tab (14). As illustrated, it is a preferred embodiment that the lower edge (19*a*) converge with the edge (16) of the first section (12) from which the tab portion (14) extends. The first section 12 can be in several different shapes such as a square, rectangle, circular or oval. As shown, it is preferred that the converting edges (16 and 19*a*) form a rounded edge (22) that is more resistant to tearing than is a sharp edge (i.e., where the edges 16 and 19*a* form a right angle to each other). More particularly, the rounded edge (22) is less likely to tear when the tab portion (14) is pulled upwardly for the purpose of lifting the label (10) off of the substrate. This preferred embodiment is crucial in preventing the label (10) from tearing, and, thus, maintaining label (10) integrity to ensure that the label is completely removed from the substrate surface. Further, maintaining label (10) integrity is important where the label user desires to reposition the label.

Where the label (10) is made of a plastic sheet or other like sheet material, the preferred embodiment of a rounded or curved edge (22) functions to keep the label from splitting or tearing when removing the label. As such, the rounded edge (22) is designed to be used with a label that is preferably fabricated from a polypropylene sheet material or other sheet material having like qualities. Fabricating the adhesive label (10) from polypropylene provides an adhesive label (10) having high strength and durability as well as the desired resistance to moisture. A preferred polypropylene base sheet material is FASSON® 3.8M Matte White Polypropylene/R-10 having Specification No. 75359, which is sold by AVERY DENNISON (250 Chester Street, Painesville, Ohio 44077). This preferred sheet material is a high opacity polypropylene film suitable for its strength and durability.

Figure 5:
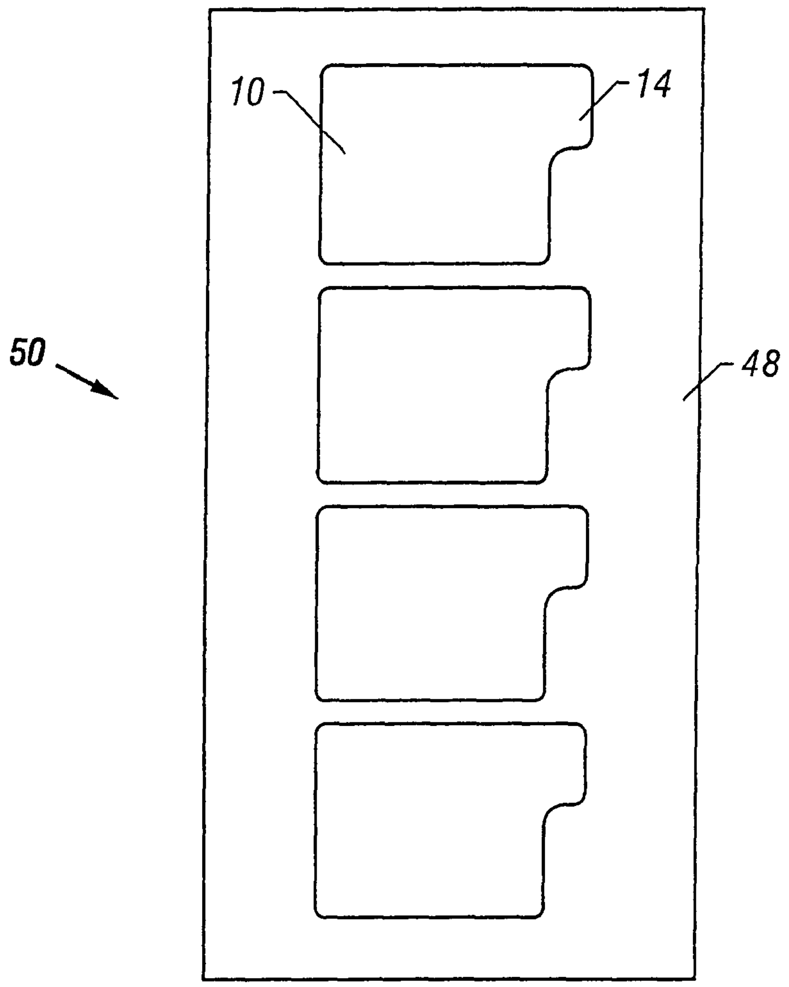
FIG. 5 is a top view of the preferred embodiment of the present invention showing a plurality of labels maintained on liner paper.

As illustrated in FIG. 5, an embodiment of the present invention includes providing a plurality of the adhesive labels (10) on a sheet of liner paper (48). In this way, the labels (10) can be provided on a sheet (50) of labels or on a roll of liner paper (not shown), as is known to one skilled in the art. In this embodiment, the tab portion (14) of the label (10) provides the label user with a convenient and easy means for removing the label (10) from a substrate surface and additionally from the liner paper (48). Specifically, the user obtains the label (10) by simply grasping the tab portion (14) and lifting the label off of the liner paper (48) used to construct the roll or sheet of labels (10). Holding the adhesive free tab portion (14), the user can then easily apply the label to a substrate surface. A preferred liner paper for constructing the roll or sheet of labels is also sold by AVERY DENNISON under the trade name FASSON® 320 LF. The liner paper (48) has a surface that readily separates from the adhesive layer (18) of the label.

Figure 3:
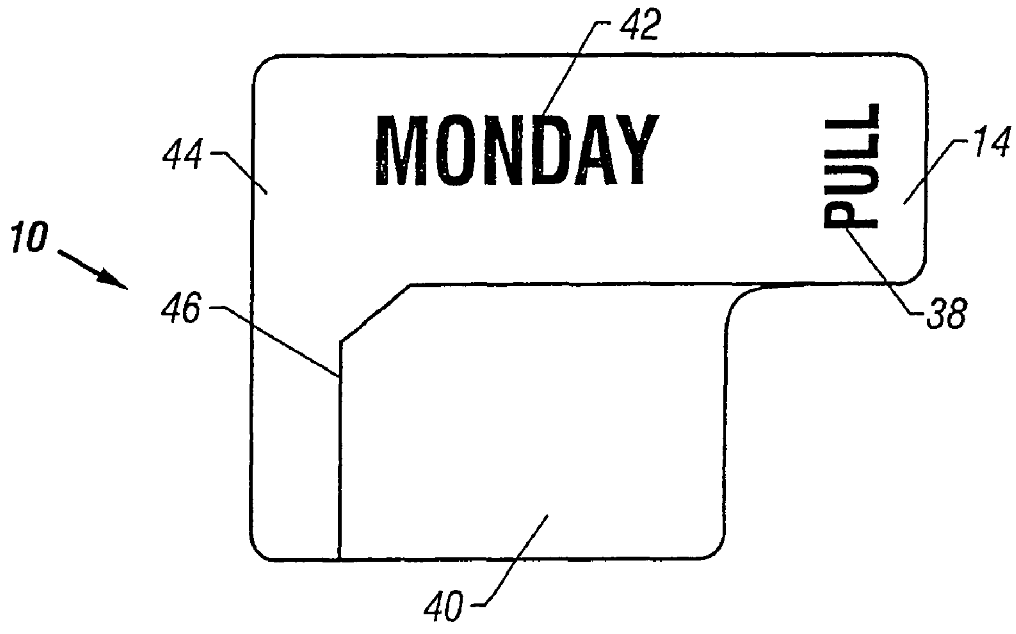
FIG. 3 is top surface view of a label showing an example of the printed surface that can be used with the label of the present invention.
Figure 6:
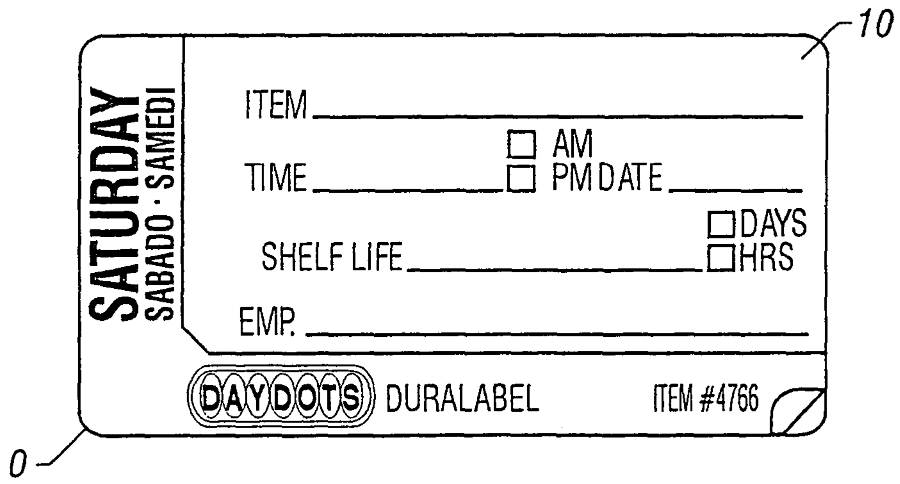
FIG. 6 is a top surface view of an embodiment of the present invention with printing related to a food safety labeling system.
Figure 7:
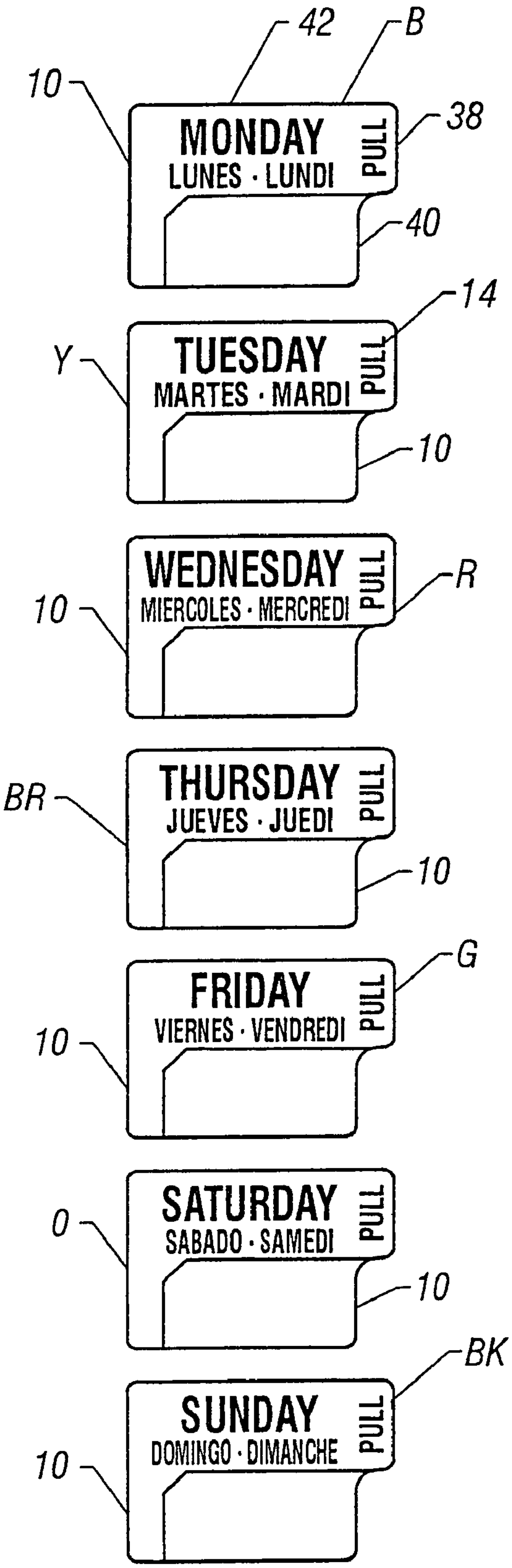
FIG. 7 is a top surface view of another embodiment of the present invention with printing related to a food safety labeling system.

FIGS. 3, 6 and 7, illustrate preferred embodiments of the present invention showing printed information to assist the user of the label (10). As illustrated in FIGS. 3 and 7, the tab portion (14) includes the word "PULL" (38) printed on the front side (25). This instructs the user of the label (10) to pull on the tab portion (14) when it is desired that the label be removed from the surface. Another example of the type of information that can be provided is the day of the week, which for purposes of illustration is "MONDAY" (42) printed on the front side (26) of section (12). It is also preferable that the label (10) be color-coded. Particularly, the surface indicated as numeral (44) can be of any color in the known industry color code system used in food safety labeling systems. The colored surface (44), however, does not necessarily cover the entire upper surface of the label (10), but rather can terminate at a boundary (46) adjacent a non-colored surface (40). In this embodiment, the non-colored surface (40) is preferably white, and provides a smooth surface, which is adapted to be easily written upon by a pen or pencil. It should be understood by those skilled in the art that various information boxes or blank surfaces can be provided without deviating from the scope of the present invention.

The inventive labels (10) can be made to conform to the three main types of labels used in food safety labeling systems—day of the week FIFO (first in first out) systems, shelf-life/product identification labels and use by/use first labels. The labels (10) can include the established food safety color code system in which the color blue B is for Monday, yellow Y for Tuesday, red R for Wednesday, brown BR for Thursday, green G for Friday, orange O for Saturday, and black BK for Sunday (FIGS. 6 and 7). The labels (10) can also include day-of-the-week text, as illustrated in FIGS. 3, 6 and 7 as well as other food rotation text. Preferably, the text will be multilingual to include any combinations of English, Spanish, French, Italian or German. Additionally, the inventive labels (10) will utilize face materials and adhesives specifically designed for food rotation and FIFO labeling in the food services industry.

Figure 4:
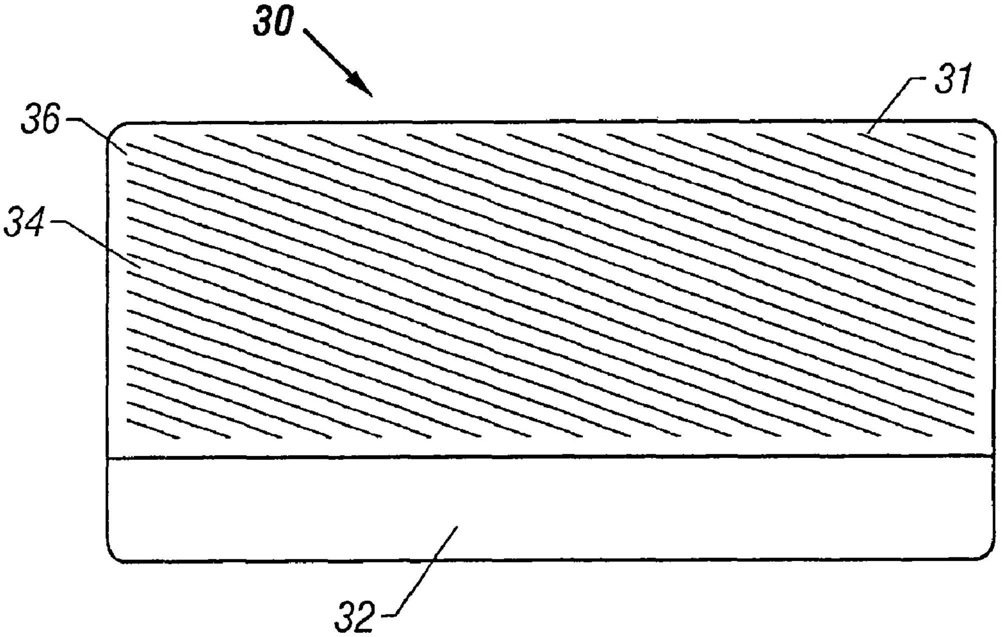
FIG. 4 is a back side view of a label of the present invention having a rectangular body and an edge portion without an adhesive layer.

FIGS. 4 and 6 illustrate an alternate embodiment of the present invention made in accordance with the label illustrated in FIGS. 1 and 2. FIG. 4 shows the first or back side (34) of a label (30) that comprises a substantially rectangular section including an edge portion (32) that is free of any adhesive. The remaining portion of the back side (34) of the label (30) includes an adhesive layer (36). As described above, the purpose of the adhesive free edge portion (32) is to provide a user of the label (30) with the means for grasping the label (30) and removing it from the substrate by pulling upwardly on edge portion (32). FIG. 6 illustrates the printing that can be placed on the second or front side of the label (30).

Various embodiments of the present invention have been described herein. It should be understood by those of ordinary skill in the art, however, that the above described embodiments of the present invention are set forth merely by way of example and should not be interpreted as limiting the scope of the present invention, which is defined by the appended claims. Many other alternative embodiments, variations and modifications of the foregoing embodiments that embrace various aspects of the present invention will also be understood upon a reading of the detailed description in light of the prior art. For instance, it will be understood that features of one embodiment may be combined with features of other embodiments while many other features may be omitted (or replaced) as being nonessential to the practice of the present invention.

What is claimed is:

1. A method of food rotation comprising:

a) applying a polypropylene adhesive label to the surface of a container holding food, the adhesive label consisting of:

i) a first portion comprising a front surface printed with a name of one day of the week, wherein the name of the day of the week is in at least two languages selected from the group consisting of English, Spanish, French, Italian, and German, and at least a portion of the front surface includes a color coordinated with the name of the day of the week wherein the color is selected from a group of colors consisting of blue for Monday, yellow for Tuesday, red for Wednesday, brown for Thursday, green for Friday, orange for Saturday, and black for Sunday; a back surface; and an adhesive layer located on a back surface, the adhesive layer adapted to remain adhered to a substrate and the label during exposure to temperatures throughout the range between approximately −40° C. and +50° C.; and ii) a tab portion extending from the first portion, the tab portion having a front surface and a back surface, the back surface of the tab portion being substantially free of adhesive wherein the tab portion has a rounded edge;

b) storing the container holding food for a period of time not to extend past the day of the week listed on the first portion of the label; and c) removing the adhesive label from the surface of the container by grasping the tab portion of the adhesive label and pulling upwardly on the tab portion thereby lifting the label off of the surface of the container without leaving behind a label remnant or residue from the adhesive.

2. The method of claim 1, wherein the adhesive label is in a shape selected from the group consisting of a square shape, a triangular shape, a rectangular shape, a circular shape, and an oval shape.

3. The method of claim 1, wherein the front surface is adapted to accept printing of text.

4. The method of claim 1, wherein the tab portion is printed with the word pull.

* * * * *